(12) United States Patent
Hu et al.

(10) Patent No.: US 11,487,077 B2
(45) Date of Patent: Nov. 1, 2022

(54) OPTICAL ELEMENT DRIVING MECHANISM

(71) Applicant: TDK TAIWAN CORP., Taoyuan (TW)

(72) Inventors: Chao-Chang Hu, Taoyuan (TW);
Chao-Hsi Wang, Taoyuan (TW);
Chih-Wei Weng, Taoyuan (TW);
Kuen-Wang Tsai, Taoyuan (TW);
Sin-Jhong Song, Taoyuan (TW)

(73) Assignee: TDK TAIWAN CORP., Taoyuan (TW)

( * ) Notice: Subject to any disclaimer, the term of this patent is extended or adjusted under 35 U.S.C. 154(b) by 358 days.

(21) Appl. No.: 16/800,532

(22) Filed: Feb. 25, 2020

(65) Prior Publication Data

US 2020/0271892 A1    Aug. 27, 2020

Related U.S. Application Data

(60) Provisional application No. 62/809,891, filed on Feb. 25, 2019.

(30) Foreign Application Priority Data

Feb. 3, 2020 (CN) ......................... 202020150556.X

(51) Int. Cl.
*H02K 41/03* (2006.01)
*G02B 7/09* (2021.01)
(Continued)

(52) U.S. Cl.
CPC .............. *G02B 7/09* (2013.01); *H02K 33/00* (2013.01); *H02K 33/12* (2013.01); *H02K 41/0354* (2013.01); *H02K 41/0356* (2013.01)

(58) Field of Classification Search
CPC ...... H02K 41/00; H02K 41/03; H02K 41/035; H02K 41/0354; H02K 41/0356; H02K 33/00; H02K 33/12; G02B 7/00; G02B 7/08; G02B 7/09; G02B 27/00; G02B 27/64; G02B 27/646

See application file for complete search history.

(56) References Cited

U.S. PATENT DOCUMENTS

| 2006/0226713 A1* | 10/2006 | Lehr ...................... F16C 33/043 |
| | | 310/12.04 |
| 2008/0100151 A1* | 5/2008 | Takeuchi ............... H02K 21/04 |
| | | 310/156.01 |
| 2012/0001499 A1* | 1/2012 | Makino .................. H02K 41/03 |
| | | 310/12.14 |

* cited by examiner

*Primary Examiner* — Tran N Nguyen
(74) *Attorney, Agent, or Firm* — Muncy, Geissler, Olds & Lowe, P.C.

(57) ABSTRACT

An optical element driving mechanism includes a fixed assembly, a movable assembly, a driving assembly and a circuit assembly. The driving assembly is configured to drive the movable assembly to move relative to the fixed assembly. The driving assembly includes a first coil group which has a plurality of first coils and a magnetic module which has a magnetic element and a first conductive element. The circuit assembly includes a first circuit member electrically connected to the first conductive element and a second circuit member electrically connected to the first coils. When the magnetic module is located in different positions relative to the first coil group, the first conductive element is electrically connected to different first coils in sequence, so that the first coil is electrically connected to the first circuit member and the second circuit member, and other first coils remain open.

20 Claims, 14 Drawing Sheets

(51) Int. Cl.
*H02K 41/035* (2006.01)
*H02K 33/12* (2006.01)
*H02K 33/00* (2006.01)

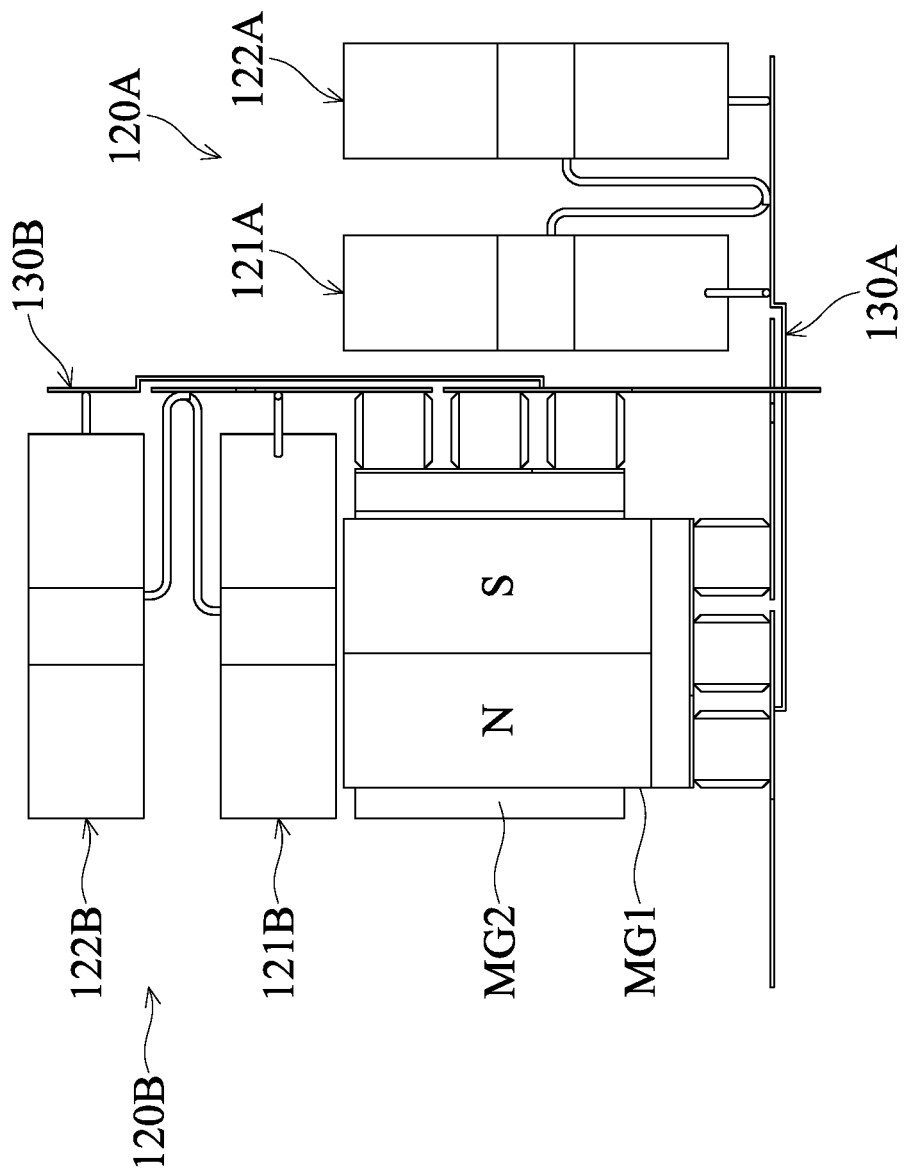
FIG. 10B
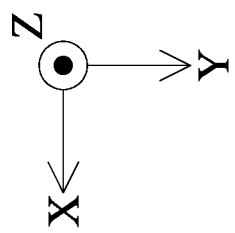

OPTICAL ELEMENT DRIVING MECHANISM

CROSS REFERENCE TO RELATED APPLICATIONS

This application claims the benefit of U.S. Provisional Application No. 62/809,891, filed Feb. 25, 2019, and China Patent Application No. 202020150556.X, filed Feb. 3, 2020, the entirety of which are incorporated by reference herein.

BACKGROUND OF THE DISCLOSURE

Field of the Disclosure

The present disclosure relates to an optical element driving mechanism, and in particular it relates to an optical element driving mechanism having a linear motor.

Description of the Related Art

As technology has developed, many of today's electronic devices (such as smartphones) have a camera or video functionality. Using the camera modules disposed in electronic devices, users can operate their electronic devices to capture photographs and record videos.

The design trend of today's electronic devices is toward miniaturization, meaning that the various components of a camera module or its structure must also be continuously reduced, so as to achieve miniaturization. In general, a driving mechanism in a camera module has a camera lens holder configured to hold a camera lens, and the driving mechanism can have the functions of auto focusing or optical image stabilization. However, although the existing driving mechanism can perform the aforementioned functions of photographing or video recording, they still cannot meet all the needs of miniaturization.

Therefore, how to design a camera module that has stronger driving capability and reduce the thickness of electronic devices is a topic nowadays that needs to be discussed and solved.

BRIEF SUMMARY OF THE DISCLOSURE

Accordingly, one objective of the present disclosure is to provide an optical element driving mechanism to solve the above problems.

According to some embodiments of the disclosure, an optical element driving mechanism is provided and includes a fixed assembly, a movable assembly, a driving assembly and a circuit assembly. The movable assembly is movable relative to the fixed assembly. The driving assembly is configured to drive the movable assembly to move relative to the fixed assembly. The driving assembly includes a first coil group and a magnetic module. The first coil group has a plurality of first coils, and each of the first coils includes a first electrical connection portion and a second electrical connection portion. The magnetic module has a magnetic element and a first conductive element. The circuit assembly includes a first circuit member and a second circuit member. The first circuit member is electrically connected to the first conductive element. The second circuit member is electrically connected to the first electrical connection portions. When the magnetic module is located in different positions relative to the first coil group, the first conductive element is electrically connected to the second electrical connection portion of different first coils in sequence, so that the first coils which are electrically connected to the first conductive element are electrically connected to the first circuit member and the second circuit member, and the second electrical connection portions of the first coils which are not electrically connected to the first conductive element remain open.

According to some embodiments, the magnetic module further includes a second conductive element, the first conductive element is electrically connected to the first circuit member through the second conductive element, and the second conductive element is movable relative to the first conductive element or the first circuit member.

According to some embodiments, the second conductive element is movable relative to the first conductive element and the first circuit member.

According to some embodiments, the intervals between the second electrical connection portions are substantially the same.

According to some embodiments, the magnetic module further includes an insulating element disposed between the magnetic element and the first conductive element.

According to some embodiments, the driving assembly further includes a second coil group which has a plurality of second coils, and the first coil group and the second coil group are disposed on different planes.

According to some embodiments, each of the second coils includes a third electrical connection portion which is electrically connected to the second circuit member and a fourth electrical connection portion. When the magnetic module is located in different positions relative to the second coil group, the first conductive element is electrically connected to the fourth electrical connections of different second coils in sequence, so that the second coils which are electrically connected to the first conductive element are electrically connected to the first circuit member and the second circuit member, and the fourth electrical connections of the second coils which are not electrically connected to the first conductive element remain open.

According to some embodiments, when viewed in a direction of a winding axis of the first coil, the first coil partially overlaps at least two second coils.

According to some embodiments, the magnetic module is disposed between the first coil group and the second coil group.

According to some embodiments, the second electrical connection portions and the fourth electrical connection portions are disposed on the same plane.

According to some embodiments, the first coil group is disposed between the magnetic module and the second coil group.

According to some embodiments, the optical element driving mechanism further includes a plurality of first conductive plates and a plurality of second conductive plates, the first coil is electrically connected to the corresponding first conductive plate, the second coil is electrically connected to the corresponding second conductive plate, and the first conductive plate and at least one portion of the second conductive plate are disposed on different planes.

According to some embodiments, the optical element driving mechanism further includes a pressing assembly configured to drive the magnetic element to contact the first circuit member.

According to some embodiments, the pressing assembly includes a magnetically conductive element corresponding to the magnetic element.

According to some embodiments, the first coils are arranged in a first direction, and the driving assembly is configured to drive the movable assembly to move in the first direction relative to the fixed assembly.

According to some embodiments, a magnetic pole direction of the magnetic element is parallel to the first direction.

According to some embodiments, the magnetic element has a plurality of magnetic pole units, and magnetic pole directions of the magnetic pole units are different from the first direction.

According to some embodiments, the optical element driving mechanism includes a plurality of movable assemblies and a plurality of driving assemblies, and these movable assemblies are arranged in the first direction.

According to some embodiments, each of the driving assemblies includes a magnetic element, and magnetic pole directions of the magnetic elements are parallel to each other.

According to some embodiments, each of the driving assemblies includes a magnetic element, and magnetic pole directions of the magnetic elements are different.

According to some embodiments of the disclosure, an optical element driving mechanism is provided and includes a fixed assembly, a movable assembly, and a driving assembly. The movable assembly is connected to an optical element. The driving assembly is configured to drive the movable assembly to move relative to the fixed assembly in a first direction, and the movable assembly moves relative to the fixed assembly within a limit range of motion. The driving assembly includes a first coil group and a magnetic module. The first coil group has a plurality of first coils, and each of the first coils includes a first end portion and a second end portion which are parallel to each other and are arranged in the first direction. The magnetic module has a magnetic element, and the magnetic element has a first magnetic portion and a second magnetic portion which are arranged in the first direction. A shortest distance between the first end portion and the second end portion is less than the limit range of motion.

The present disclosure provides an optical element driving mechanism configured to drive the movable assembly (for example, a camera lens) for performing the auto-focus function. In an embodiment of the present disclosure, the optical element driving mechanism may include a first coil group, a second coil group, and a magnetic module. When the first coil group and the second coil group are provided with electricity, they can act with the magnetic module to generate the electromagnetic driving force to move the magnetic module in the first direction. Because the coils in the first coil group and the second coil group are turned on in sequence, it can ensure that the magnetic module moves smoothly in the first direction, and the range of motion of the movable assembly can be increased.

Based on the design of the optical element driving mechanism in this disclosure, a greater driving force can be achieved to drive the aforementioned camera lens, and the purpose of miniaturization can also be achieved at the same time.

Additional features and advantages of the disclosure will be set forth in the description which follows, and, in part, will be obvious from the description, or can be learned by practice of the principles disclosed herein. The features and advantages of the disclosure can be realized and obtained by means of the instruments and combinations pointed out in the appended claims. These and other features of the disclosure will become more fully apparent from the following description and appended claims, or can be learned by the practice of the principles set forth herein.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIG. 10B is a front view of FIG. 10A according to another embodiment of the present disclosure.

DETAILED DESCRIPTION OF THE ILLUSTRATIVE EMBODIMENTS

Figure 1:
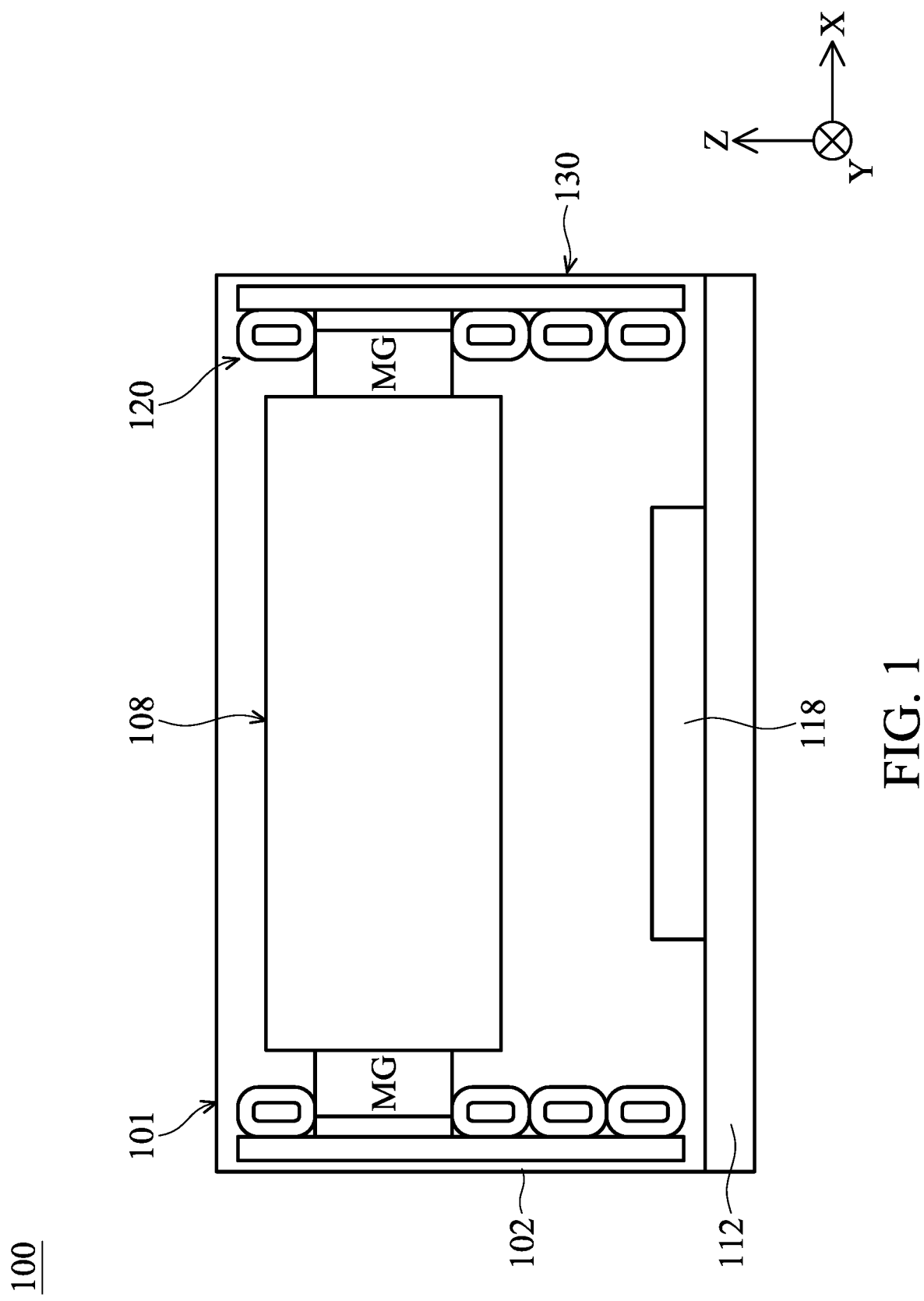
FIG. 1 is a schematic diagram of an optical element driving mechanism 6-100 according to an embodiment of the present disclosure.

In the following detailed description, for the purposes of explanation, numerous specific details and embodiments are set forth in order to provide a thorough understanding of the present disclosure. The specific elements and configurations described in the following detailed description are set forth in order to clearly describe the present disclosure. It will be apparent, however, that the exemplary embodiments set forth herein are used merely for the purpose of illustration, and the inventive concept can be embodied in various forms without being limited to those exemplary embodiments. In addition, the drawings of different embodiments can use like and/or corresponding numerals to denote like and/or corresponding elements in order to clearly describe the present disclosure. However, the use of like and/or corresponding numerals in the drawings of different embodiments does not suggest any correlation between different embodiments. The directional terms, such as "up", "down", "left", "right", "front" or "rear", are reference directions for accompanying drawings. Therefore, using the directional terms is for description instead of limiting the disclosure.

In this specification, relative expressions are used. For example, "lower", "bottom", "higher" or "top" are used to describe the position of one element relative to another. It should be appreciated that if a device is flipped upside down, an element at a "lower" side will become an element at a "higher" side.

The terms "about" and "substantially" typically mean +/−20% of the stated value, more typically +/−10% of the stated value and even more typically +/−5% of the stated value. The stated value of the present disclosure is an approximate value. When there is no specific description, the stated value includes the meaning of "about" or "substantially".

Please refer to FIG. 1, which is a schematic diagram of an optical element driving mechanism 6-100 according to an embodiment of the present disclosure. In this embodiment, the optical element driving mechanism 6-100 can be an optical camera module, which can be installed in various electronic devices or portable electronic devices, such as a smart phone, for allowing users to perform image capture function. In this embodiment, the optical element driving mechanism 6-100 may be a voice coil motor (VCM) with an autofocus (AF) function, but this disclosure is not limited thereto. In other embodiments, the optical element driving mechanism 6-100 may also have the functions of automatic focus (AF) and optical image stabilization (OIS). In addition, the optical element driving mechanism 6-100 can be a periscope camera module.

As shown in FIG. 1, the optical element driving mechanism 6-100 includes a fixed assembly 6-101, a movable assembly 6-108, a driving assembly 6-120, and a circuit assembly 6-130. The fixed assembly 6-101 may include a casing 6-102 and a base 6-112. The movable assembly 6-108 is disposed in the fixed assembly 6-101 and configured to hold and drive an optical element (not shown in the figures), for example a camera lens. The circuit assembly 6-130 can be fixed to the fixed assembly 6-101 and can be electrically connected to the driving assembly 6-120, and the driving assembly 6-120 is configured to drive the movable assembly 6-108 to move relative to the fixed assembly 6-101, such as moving along the Z-axis (the first direction). A photosensitive element 6-118 can be disposed on the base 6-112, and the external light may arrive at the photosensitive element 6-118 after traveling through the optical element held by the movable assembly 6-108 so as to generate a digital image. The driving assembly 6-120 and the circuit assembly 6-130 may be a linear motor, but they are not limited to this embodiment.

Figure 2:
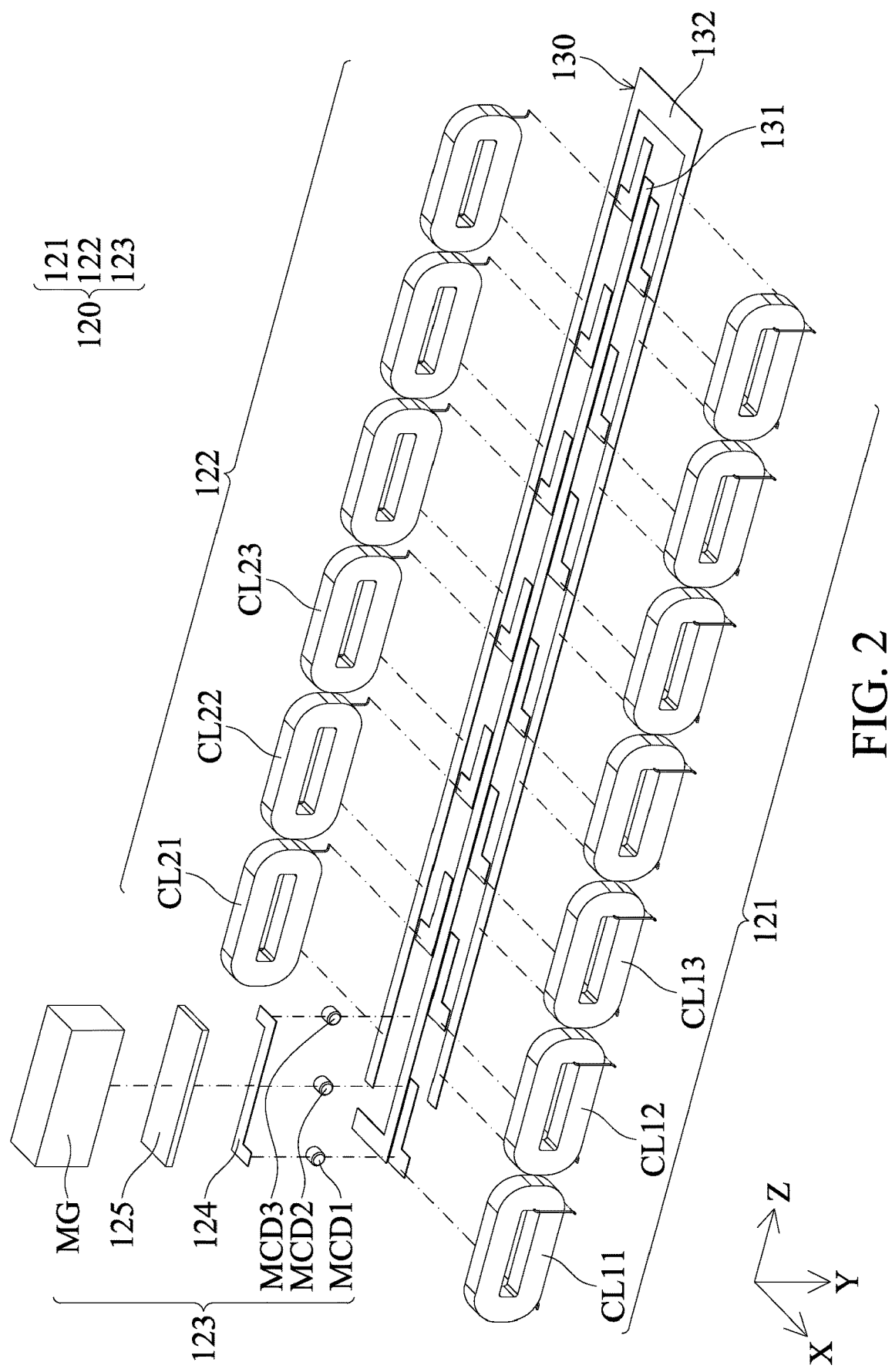
FIG. 2 is an exploded diagram of the driving assembly 6-120 and the circuit assembly 6-130 according to an embodiment of the present disclosure.
Figure 3:
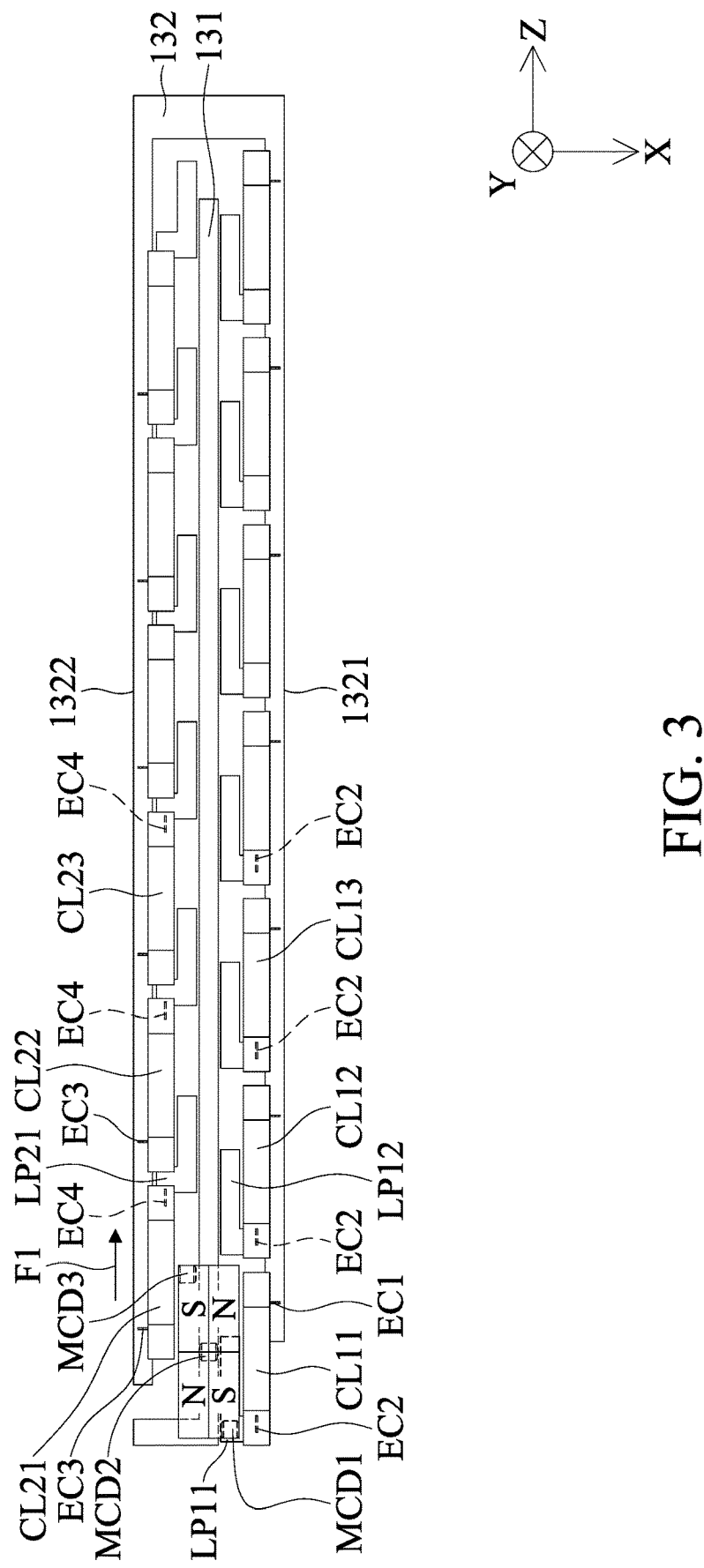
FIG. 3 is a top view of the driving assembly 6-120 and the circuit assembly 6-130 according to an embodiment of the present disclosure.

Please refer to FIG. 2 and FIG. 3. FIG. 2 is an exploded diagram of the driving assembly 6-120 and the circuit assembly 6-130 according to an embodiment of the present disclosure, and FIG. 3 is a top view of the driving assembly 6-120 and the circuit assembly 6-130 according to an embodiment of the present disclosure. As shown in FIG. 2, the circuit assembly 6-130 includes a first circuit member 6-131, a second circuit member 6-132, and a plurality of L-shaped conductive plates. The first circuit member 6-131 has a long strip-shaped structure and is configured to be electrically connected to the ground, and the second circuit member 6-132 has a U-shaped structure and is configured to be connected to a power source. The plurality of L-shaped conductive plates are disposed between the first circuit member 6-131 and the second circuit member 6-132.

Furthermore, as shown in FIG. 2, the driving assembly 6-120 includes a first coil group 6-121, a second coil group 6-122, and a magnetic module 6-123. The first coil group 6-121 and the second coil group 6-122 respectively have a plurality of first coils (first coils 6-CL11, 6-CL12, 6-CL13, etc.) and a plurality of second coils (second coils 6-CL21, 6-CL22, 6-CL23, etc.). The first coils and the second coils are arranged along the Z-axis (the first direction), and the first coil group 6-121 and the second coil group 6-122 are disposed on different planes.

As shown in FIG. 3, the plurality of first coils respectively correspond to the L-shaped conductive plates adjacent to a first side 6-1321 of the second circuit member 6-132, and the plurality of second coils respectively correspond to the L-shaped conductive plates adjacent to a second side 6-1322 of the second circuit member 6-132. For example, the first coil 6-CL11 corresponds to the L-shaped conductive plate 6-LP11, the second coil 6-CL21 corresponds to the L-shaped conductive plate 6-LP21, and so on. For example, the L-shaped conductive plate 6-LP12 corresponds to the first coil 6-CL12.

It should be noted that each first coil has a first electrical connection portion 6-EC1 and a second electrical connection portion 6-EC2, and the first electrical connection portion 6-EC1 is electrically connected to the second circuit member 6-132, and the second electrical connection portion 6-EC2 is electrically connected to the corresponding L-shaped conductive plate. As shown in FIG. 3, the intervals between the second electrical connection portions 6-EC2 are substantially the same along the Z-axis (the first direction).

Furthermore, each second coil has a third electrical connection portion 6-EC3 and a fourth electrical connection portion 6-EC4. The third electrical connection portion 6-EC3 is electrically connected to the second circuit member 6-132, and the fourth electrical connection portion 6-EC4 is electrically connected to the corresponding L-shaped conductive plate. Similarly, the intervals between the fourth electrical connection portions 6-EC4 are substantially the same along the Z-axis (the first direction).

In addition, as shown in FIG. 3, when viewed in a direction of the winding axis of the first coil, for example, along the X-axis (the second direction), the first coil partially overlaps at least two second coils. For example, the first coil 6-CL12 partially overlaps the second coil 6-CL21 and the second coil 6-CL22.

Figure 4:
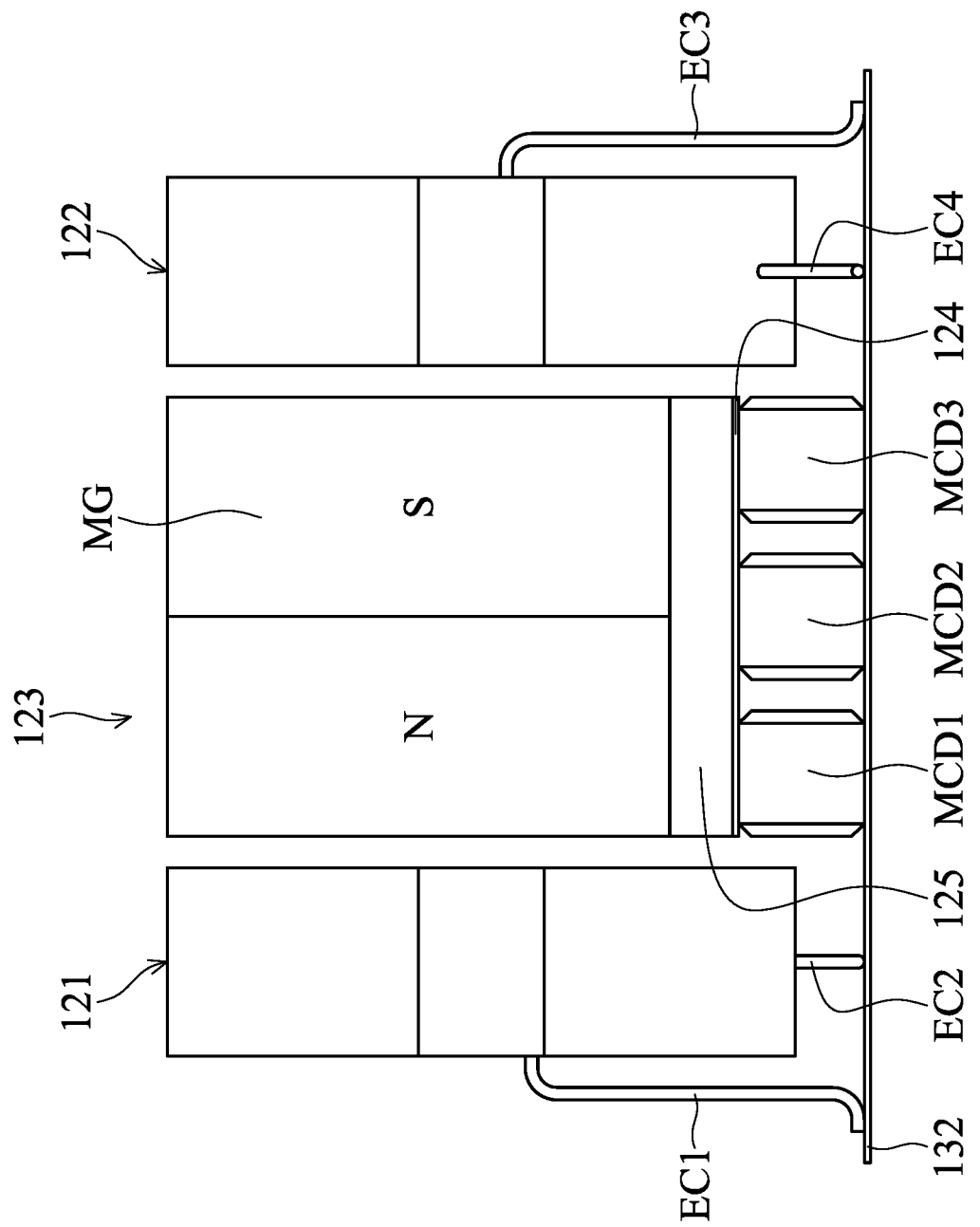
FIG. 4 is a front view of the driving assembly 6-120 and the circuit assembly 6-130 according to an embodiment of the present disclosure.

Next, please refer to FIG. 2 to FIG. 4. FIG. 4 is a front view of the driving assembly 6-120 and the circuit assembly 6-130 according to an embodiment of the present disclosure. In this embodiment, the magnetic module 6-123 may include a first conductive element 6-124, at least one second conductive element, an insulating element 6-125, and a magnetic element 6-MG. As shown in FIG. 2, the first conductive element 6-124 is in contact with three second conductive elements 6-MCD1, 6-MCD2, 6-MCD3, and the first conductive element 6-124 is electrically connected to the first circuit member 6-131 through the second conductive element 6-MCD2. The second conductive elements can be cylinders, so that the second conductive elements can move relative to the first conductive element 6-124 and/or the first circuit member 6-131, such as rolling or sliding.

As shown in FIG. 4, the insulating element 6-125 is disposed between the magnetic element 6-MG and the first conductive element 6-124 for preventing the magnetic element 6-MG from being electrically connected to these second conductive elements. In addition, the magnetic module 6-123 is disposed between the first coil group 6-121 and the second coil group 6-122.

In addition, as shown in FIG. 4, the second electrical connection portions 6-EC2 and the fourth electrical connection portions 6-EC4 are disposed on the same plane, such as the XZ plane.

In this embodiment, the magnetic element 6-MG may have a plurality of magnetic pole units, and each magnetic pole unit includes an North pole (N-pole) and a South pole (S-pole), and the magnetic pole directions of the magnetic pole units are different from the first direction. For example, as shown in FIG. 3 and FIG. 4, the magnetic element 6-MG includes a left magnetic pole unit and a right magnetic pole unit, which are arranged in the first direction, and the magnetic pole direction of each magnetic pole unit is along the X-axis (the second direction), and the second direction is perpendicular to the first direction.

When the first circuit member 6-131 is electrically connected to the ground and the second circuit member 6-132 receives a positive voltage, the magnetic module 6-123 moves along the Z-axis (the first direction). Furthermore, when the magnetic module 6-123 is located in different positions relative to the first coil group 6-121, the first conductive element 6-124 is electrically connected to the second electrical connection portion 6-EC2 of different first coils in sequence so that the first coils which are electrically connected to the first conductive element 6-124 are electrically connected to the first circuit member 6-131 and the second circuit member 6-132, and the second electrical connection portions 6-EC2 of the first coils which are not electrically connected to the first conductive element 6-124 remain open.

Similarly, when the magnetic module 6-123 is located in different positions relative to the second coil group 6-122, the first conductive element 6-124 is electrically connected to the fourth electrical connections 6-EC4 of different second coils in sequence, so that the second coils which are electrically connected to the first conductive element 6-124 are electrically connected to the first circuit member 6-131 and the second circuit member 6-132, and the fourth electrical connections 6-EC4 of the second coils which are not electrically connected to the first conductive element 6-124 remain open.

Figure 5A:
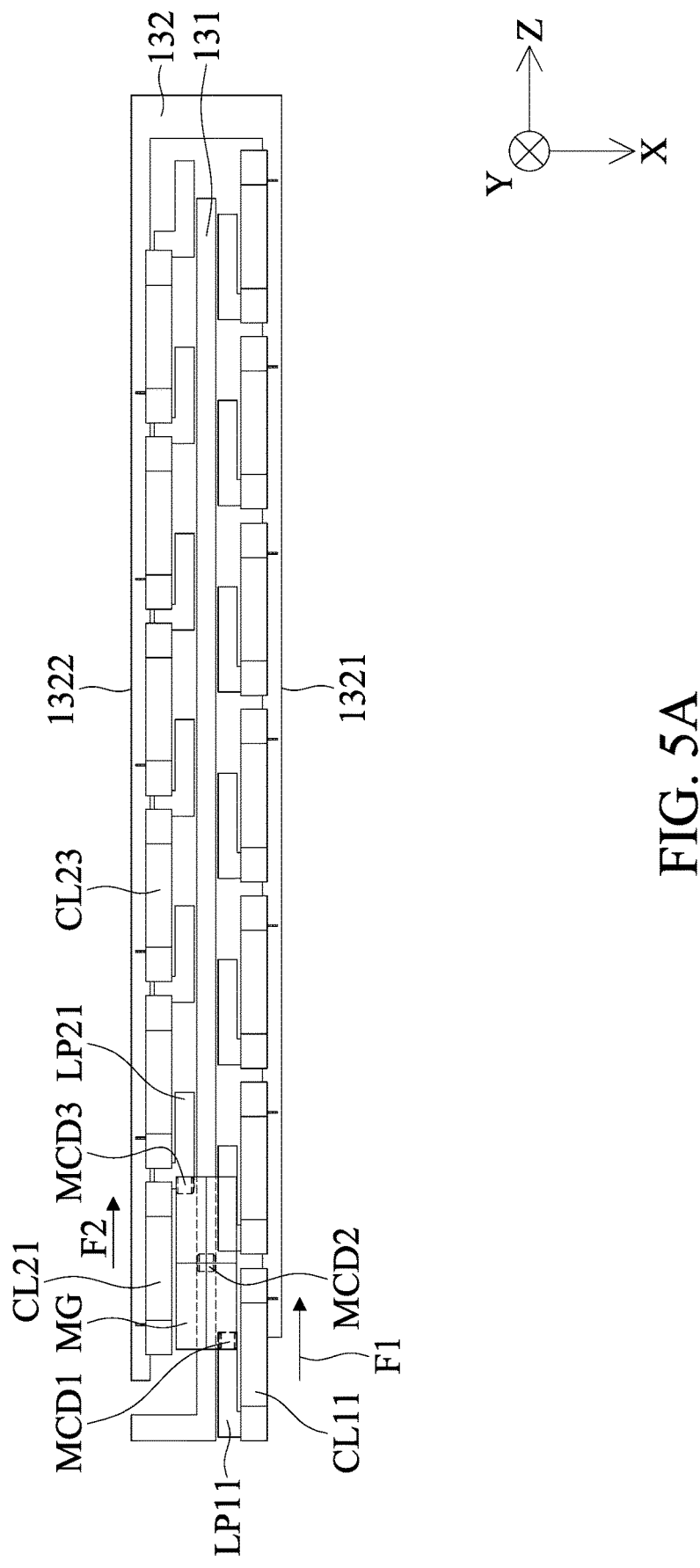
FIG. 5A and FIG. 5B are schematic diagrams of the magnetic module 6-123 located in different positions according to an embodiment of the present disclosure.
Figure 5B:
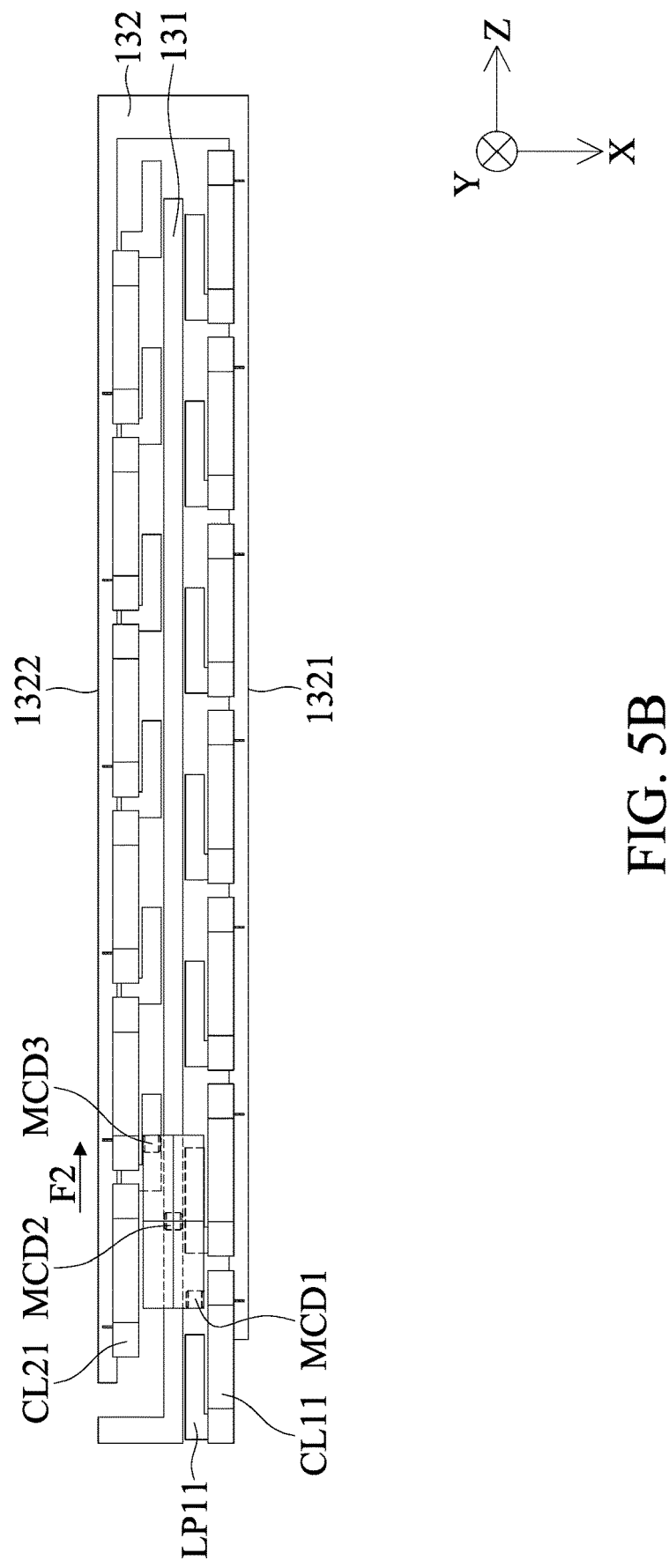

Next, please refer to FIG. 3, FIG. 5A, and FIG. 5B. FIG. 5A and FIG. 5B are schematic diagrams of the magnetic module 6-123 located in different positions according to an embodiment of the present disclosure. First, as shown in FIG. 3, the magnetic module 6-123 is located at a preset position (also referred to as an initial position). At this time, the second conductive element 6-MCD1 contacts the first L-shaped conductive plate 6-LP11 on the first side 6-1321, and the second conductive element 6-MCD2 contacts the first circuit member 6-131, so that the first coil 6-CL11 is electrically connected to the first circuit member 6-131 and the second circuit member 6-132. As a result, the first coil 6-CL11 is powered on and starts to act with the magnetic element 6-MG to generate an electromagnetic driving force 6-F1 to push the magnetic module 6-123 to move along the Z-axis (the first direction).

Next, when the magnetic module 6-123 moves to the position in FIG. 5A, the second conductive element 6-MCD3 contacts the first L-shaped conductive plate 6-LP21 on the second side 6-1322, so that the second coil 6-CL21 is electrically connected to the first circuit member 6-131 and the second circuit member 6-132. As a result, the second coil 6-CL21 is powered on and acts with the magnetic element 6-MG to generate another electromagnetic driving force 6-F2. The electromagnetic driving force 6-F2 cooperates with the electromagnetic driving force 6-F1 to push the magnetic module 6-123 so that the magnetic module 6-123 continues to move along the Z-axis (the first direction).

Furthermore, when the magnetic module 6-123 moves to the position in FIG. 5B, the second conductive element 6-MCD1 is separated from the first L-shaped conductive plate 6-LP11 on the first side 6-1321, the first coil 6-CL11 is turned off, so that at this time, the magnetic module 6-123 is pushed by the electromagnetic driving force 6-F2 to continue to move along the Z-axis (the first direction). The subsequent operation of the magnetic module 6-123 is the same, so the description about the subsequent operation is omitted herein.

Figure 6:
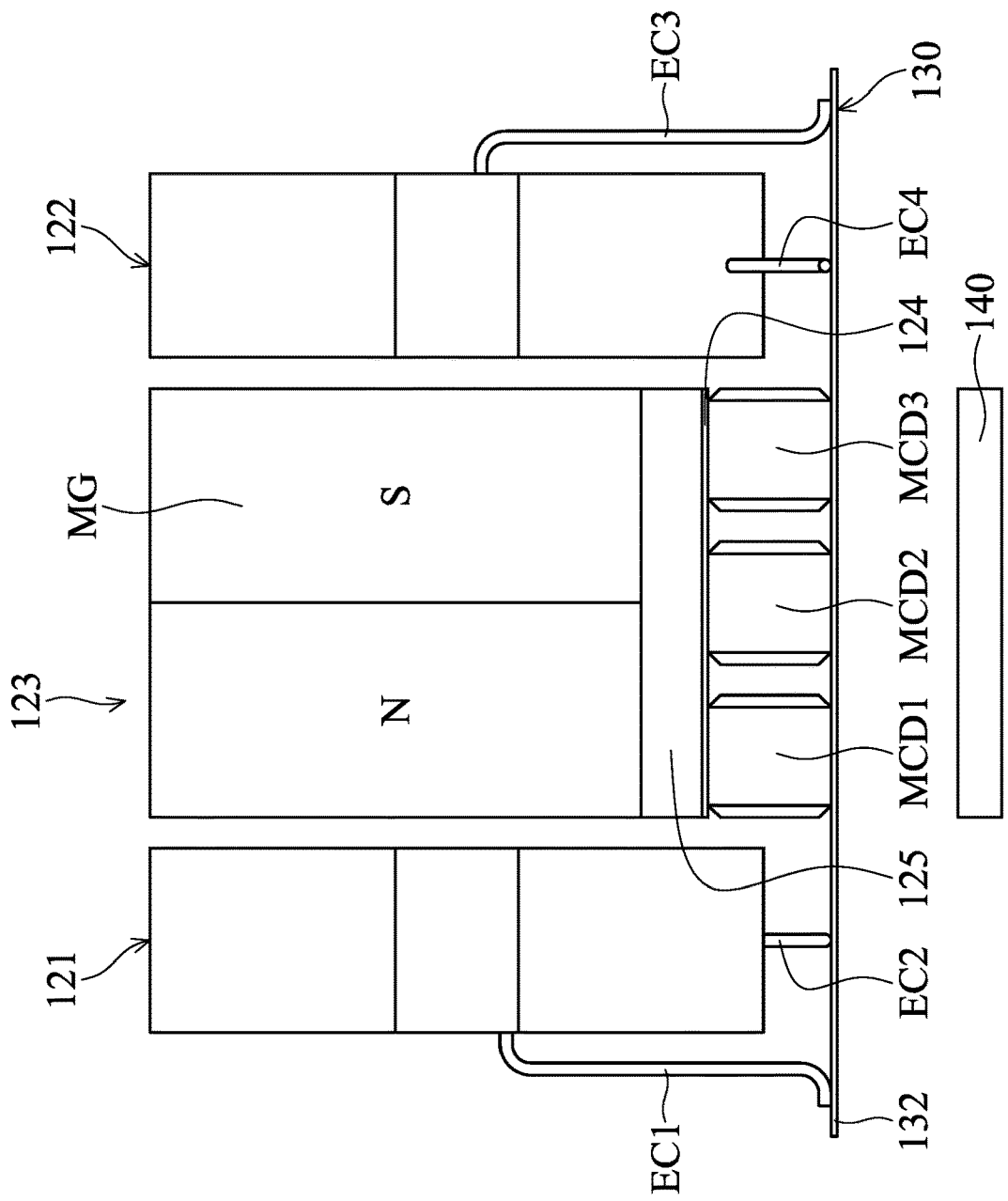
FIG. 6 is a front view of the driving assembly 6-120 and the circuit assembly 6-130 according to another embodiment of the present disclosure.

Next, please refer to FIG. 6, which is a front view of the driving assembly 6-120 and the circuit assembly 6-130 according to another embodiment of the present disclosure. In this embodiment, the optical element driving mechanism 6-100 may further include a pressing assembly 6-140 for driving the magnetic element 6-MG to contact the first circuit member 6-131. Specifically, the pressing assembly 6-140 has a magnetically conductive element, such as a magnet, corresponding to the magnetic element 6-MG, so that the magnet of the pressing assembly 6-140 and the magnetic element 6-MG generate a magnetic attraction force to drive the magnetic element 6-MG to push the pressing assembly 6-140 so as to prevent the second conductive element 6-MCD1, the second conductive element 6-MCD2, and the second conductive element 6-MCD3 from separating from the first conductive element 6-124.

Figure 7:
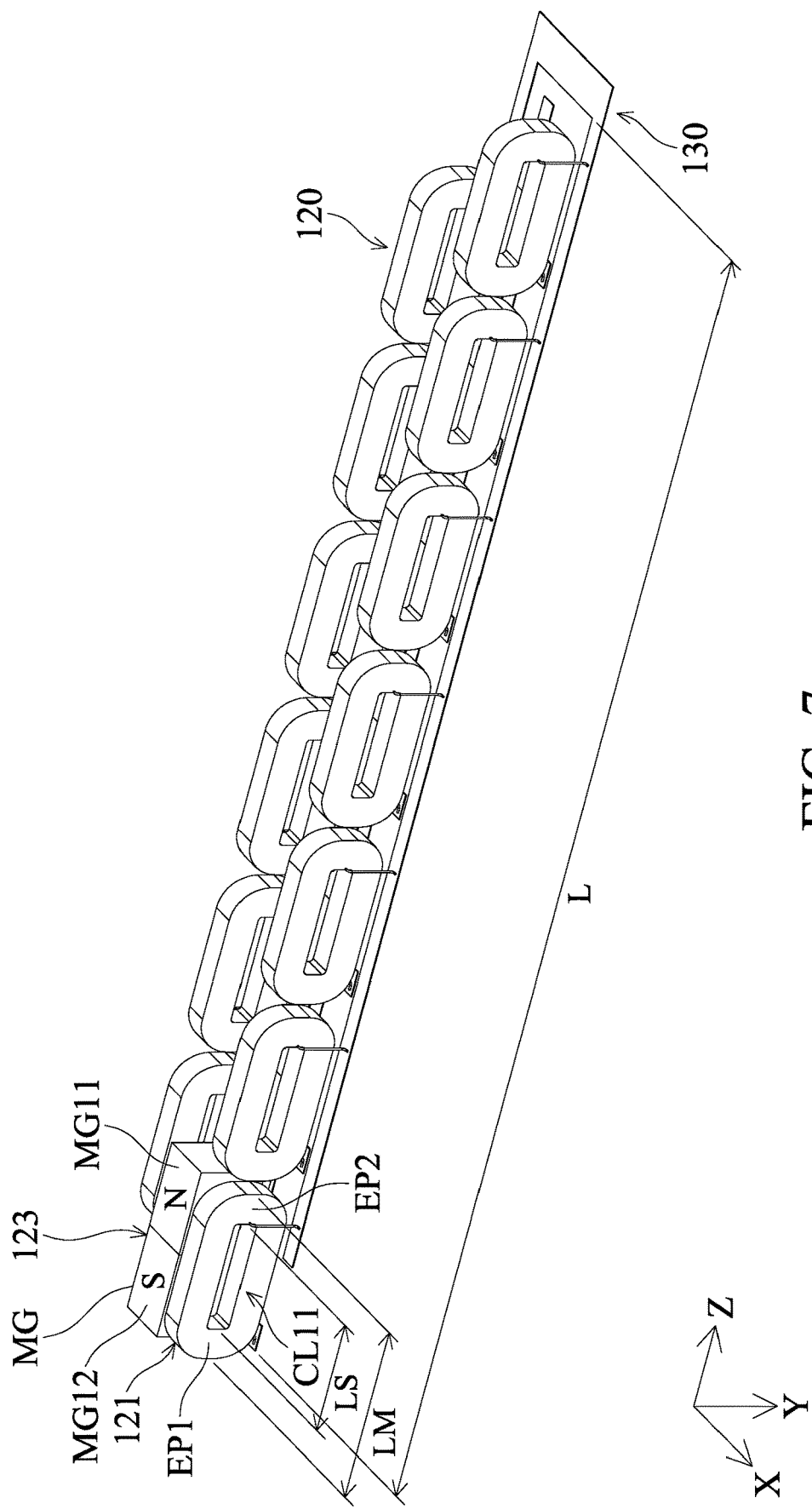
FIG. 7 is a schematic diagram of the driving assembly 6-120 and the circuit assembly 6-130 according to another embodiment of the present disclosure.

Please refer to FIG. 7, which is a schematic diagram of the driving assembly 6-120 and the circuit assembly 6-130 according to another embodiment of the present disclosure. As shown in FIG. 7, in this embodiment, the magnetic element 6-MG has a first magnetic portion 6-MG11 (the N-pole) and a second magnetic portion 6-MG12 (the S-pole), and the magnetic pole direction of the magnetic element 6-MG (that is, the arrangement direction of the N-pole and S-pole) is parallel to the Z-axis (the first direction). Therefore, the configuration and the arrangement of the driving assembly 6-120 and the circuit assembly 6-130 of the present disclosure can be determined according to the structural configuration of the electronic device to meet the actual needs.

It should be noted that the magnetic module 6-123 can be fixedly disposed on the movable assembly 6-108 in FIG. 1, so that the driving assembly 6-120 can drive the movable assembly 6-108 to move within a limit range of motion. For example, as shown in FIG. 7, the magnetic module 6-123 can move along the Z-axis (the first direction), and the limit range of motion can be a length 6-L. Furthermore, each of the first coils in the first coil group 6-121 may have a first end portion and a second end portion, which are arranged in the first direction.

For example, the first coil 6-CL11 has a first end portion 6-EP1 and a second end portion 6-EP2 that are parallel to each other. A shortest distance 6-LS between the first end portion 6-EP1 and the second end portion 6-EP2 is less than the limit range of motion (the length 6-L), and a maximum distance 6-LM between the first end portion 6-EP1 and the second end portion 6-EP2 is also shorter than the length 6-L.

Figure 8:
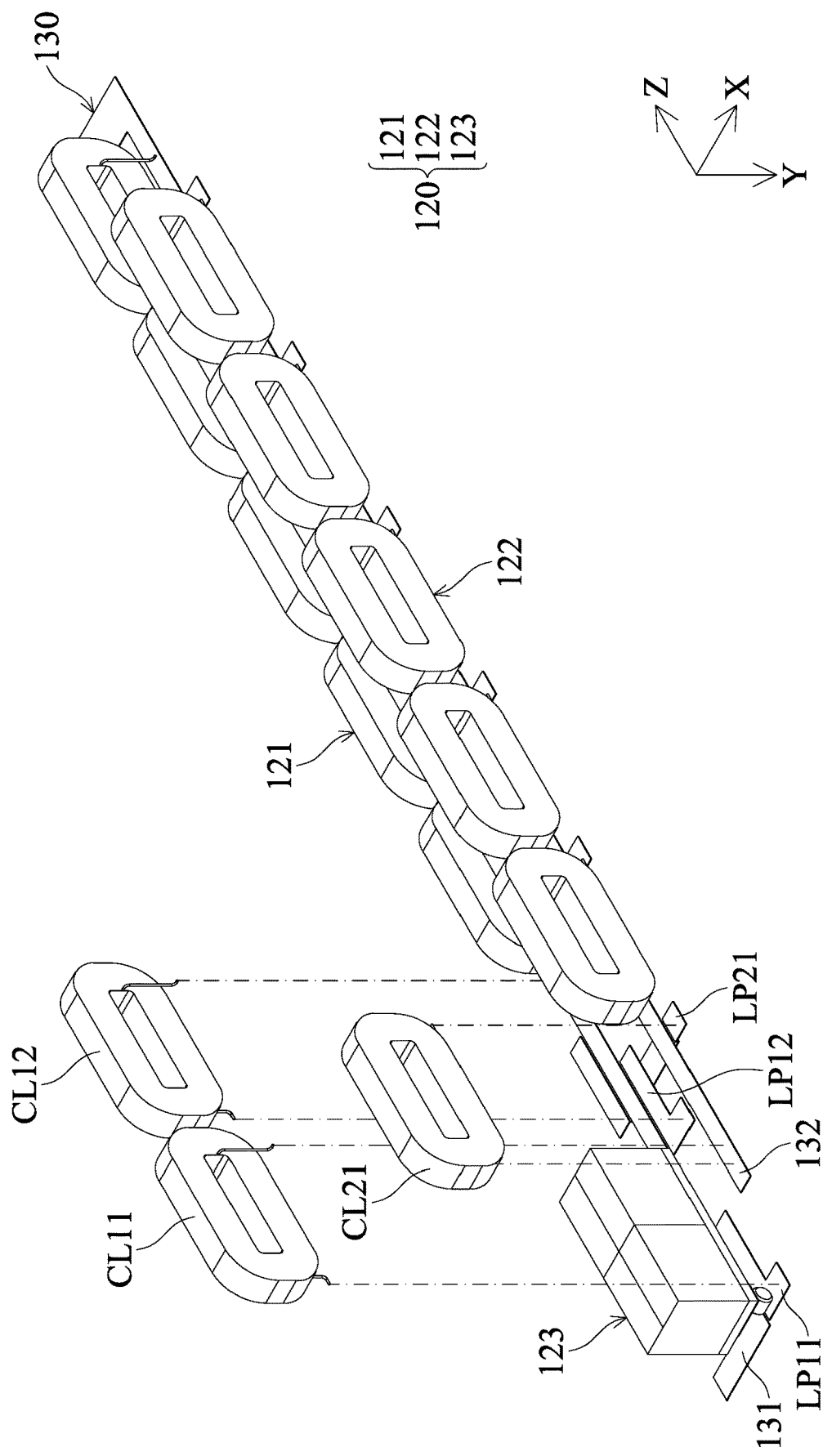
FIG. 8 is a partial exploded diagram of the driving assembly 6-120 and the circuit assembly 6-130 according to another embodiment of the present disclosure.
Figure 9:
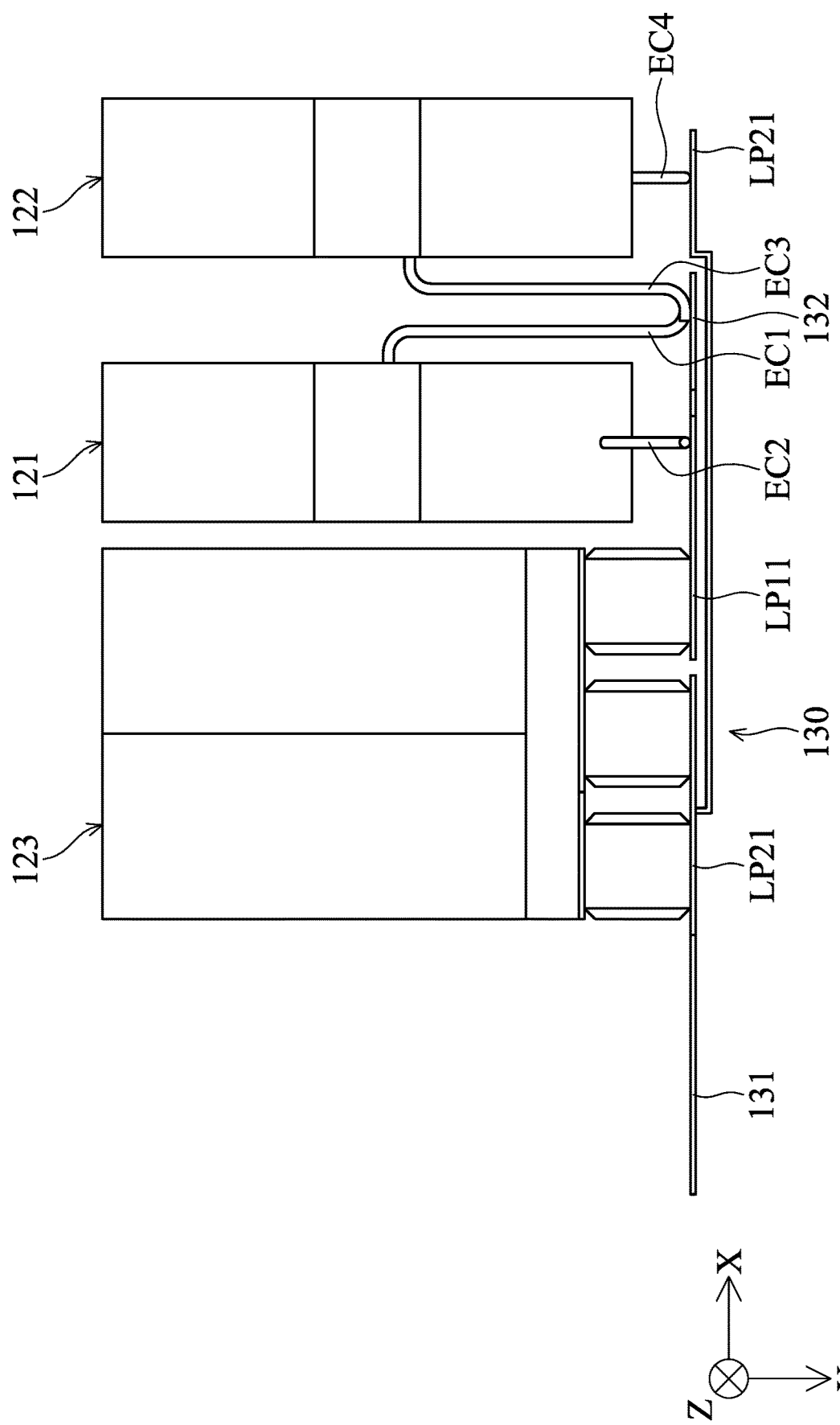
FIG. 9 is a front view of the driving assembly 6-120 and the circuit assembly 6-130 according to another embodiment of the present disclosure.

Please refer to FIG. 8 and FIG. 9. FIG. 8 is a partial exploded diagram of the driving assembly 6-120 and the circuit assembly 6-130 according to another embodiment of the present disclosure, and FIG. 9 is a front view of the driving assembly 6-120 and the circuit assembly 6-130 according to another embodiment of the present disclosure. In this embodiment, as shown in FIG. 9, the first coil group 6-121 is disposed between the magnetic module 6-123 and the second coil group 6-122.

Furthermore, the optical element driving mechanism in this embodiment may include a plurality of first conductive plates and a plurality of second conductive plates. As shown in FIG. 8, the first coil 6-CL11 is electrically connected to the corresponding first conductive plate (the L-shaped conductive plate 6-LP11), and the second coil 6-CL21 is electrically connected to the corresponding second conductive plate (the L-shaped conductive plate 6-LP21). It should be noted that, as shown in FIG. 9, the L-shaped conductive plate 6-LP11 and at least one portion of the L-shaped conductive plate 6-LP21 are disposed on different planes to prevent the L-shaped conductive plate 6-LP11 from being electrically connected to the L-shaped conductive plate 6-LP21.

Figure 10A:
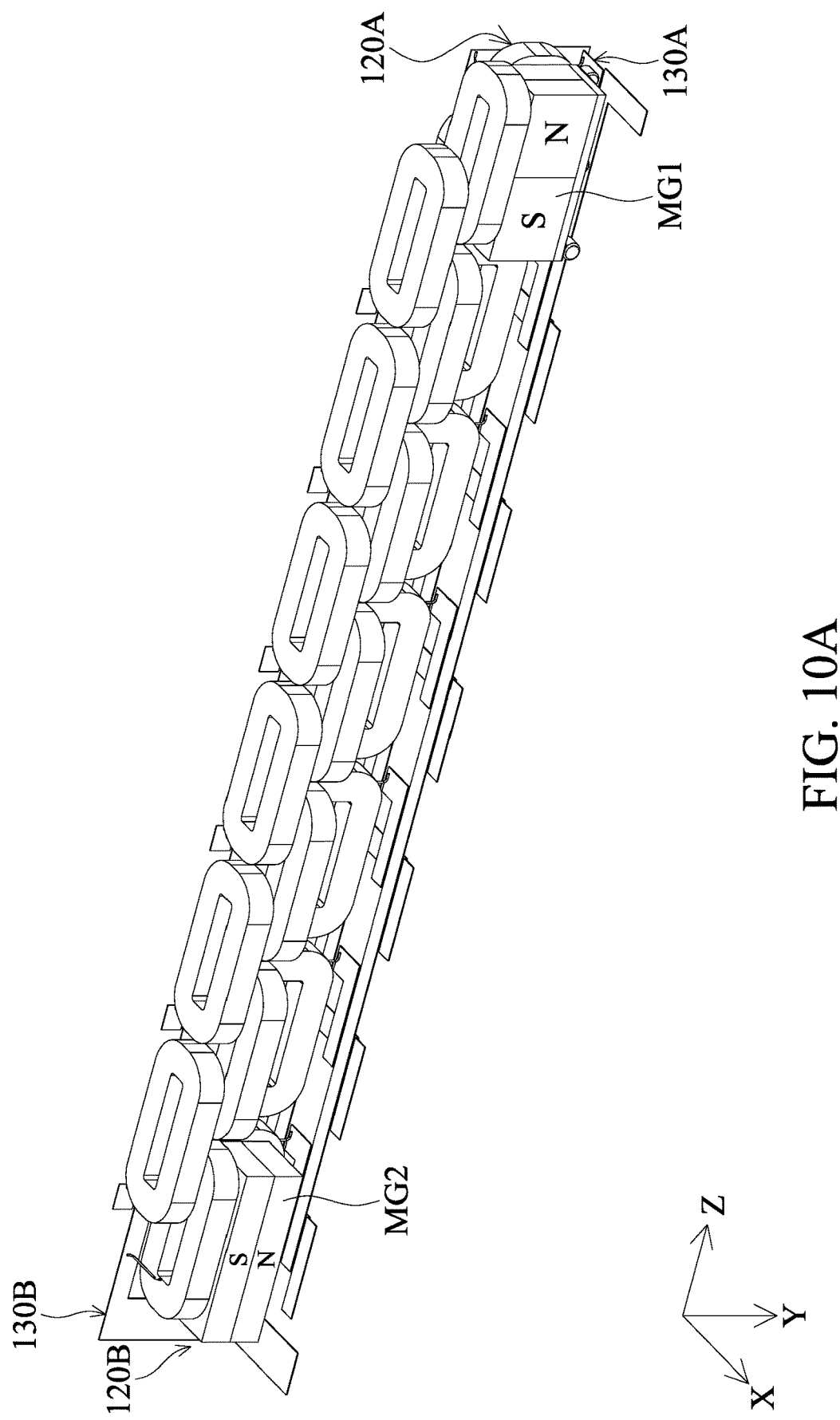
FIG. 10A is a schematic diagram of the driving assembly and the circuit assembly according to another embodiment of the present disclosure.

Please refer to FIG. 10A and FIG. 10B. FIG. 10A is a schematic diagram of the driving assembly and the circuit assembly according to another embodiment of the present disclosure, and FIG. 10B is a front view of FIG. 10A according to another embodiment of the present disclosure. In this embodiment, the optical element driving mechanism may further include a plurality of movable assemblies, a plurality of driving assemblies, and a plurality of circuit assemblies. For example, two driving assemblies 6-120A and 6-120B and two corresponding circuit assemblies 6-130A and 6-130B are provided in FIG. 10A. The magnetic element 6-MG1 of the driving assembly 6-120A can be fixedly connected to a movable assembly (not shown in the figures), and the magnetic element 6-MG2 of the driving assembly 6-120B can be fixedly connected to another movable assembly. These two movable assemblies can be similar to the movable assembly 6-108 in FIG. 1.

As shown in FIG. 10A, these movable assemblies and the magnetic elements 6-MG1, 6-MG2 are arranged along the Z-axis (the first direction), and the driving assemblies 6-120A, 6-120B can be configured to drive these movable assemblies to move in the first direction.

Furthermore, the magnetic pole directions of the magnetic element 6-MG1 and the magnetic element 6-MG2 are different. As shown in FIG. 10A, the magnetic pole direction of the magnetic element 6-MG1 is along the X-axis (the second direction), and the magnetic pole direction of the magnetic element 6-MG2 is along the Y-axis.

In addition, as shown in FIG. 10B, the circuit assembly 6-130B is disposed between the first coil group 6-121A of the driving assembly 6-120A and the magnetic element 6-MG1, and the first coil group 6-121A is disposed between the circuit assembly 6-130B and the second coil group 6-122A. Similarly, the first coil group 6-121B of the driving assembly 6-120B is disposed between the magnetic element 6-MG2 and the second coil group 6-122B.

Figure 11:
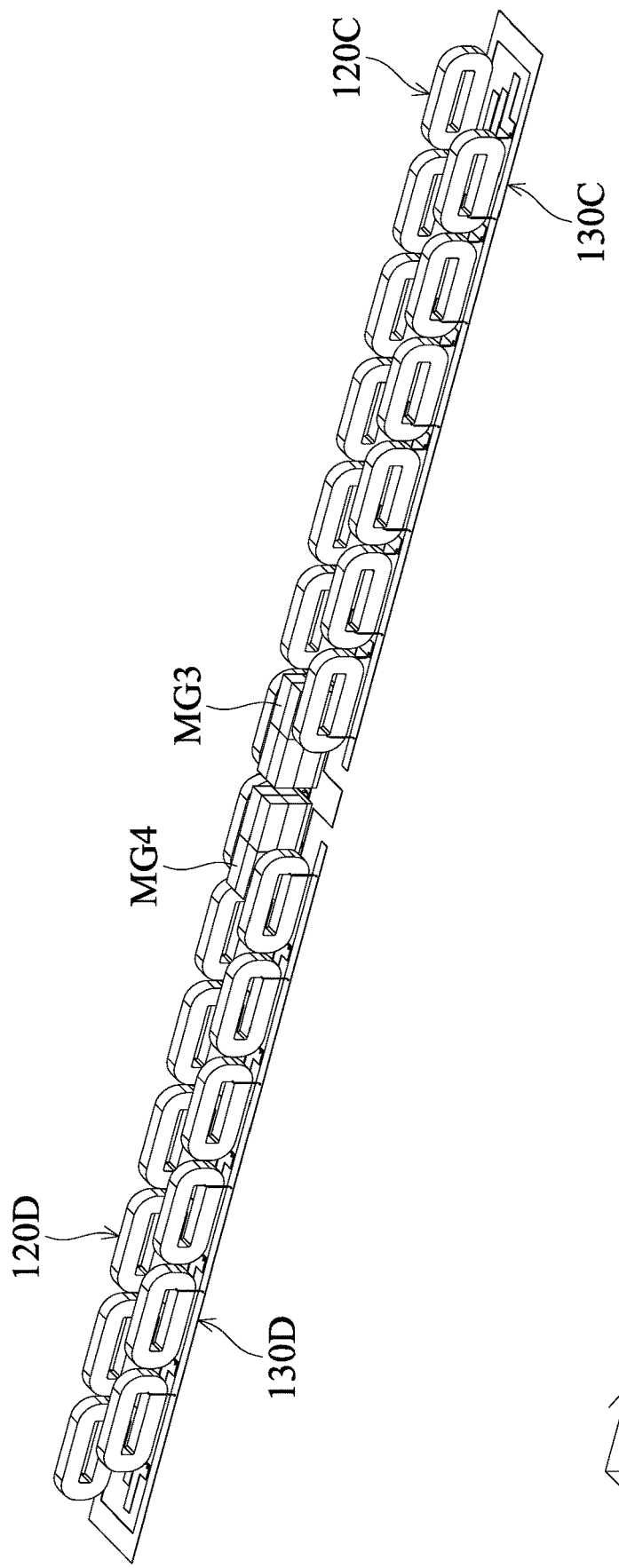
FIG. 11 is a schematic diagram of an optical element driving mechanism according to another embodiment of the present disclosure.

Please refer to FIG. 11, which is a schematic diagram of an optical element driving mechanism according to another embodiment of the present disclosure. In this embodiment, the optical element driving mechanism includes the driving assembly 6-120C, the driving assembly 6-120D, the circuit assembly 6-130C, and the circuit assembly 6-130D. The driving assembly 6-120C and the driving assembly 6-120D are similar to the driving assembly 6-120, and the circuit assembly 6-130C and the circuit assembly 6-130D are similar to the circuit assembly 6-130.

Figure 12:
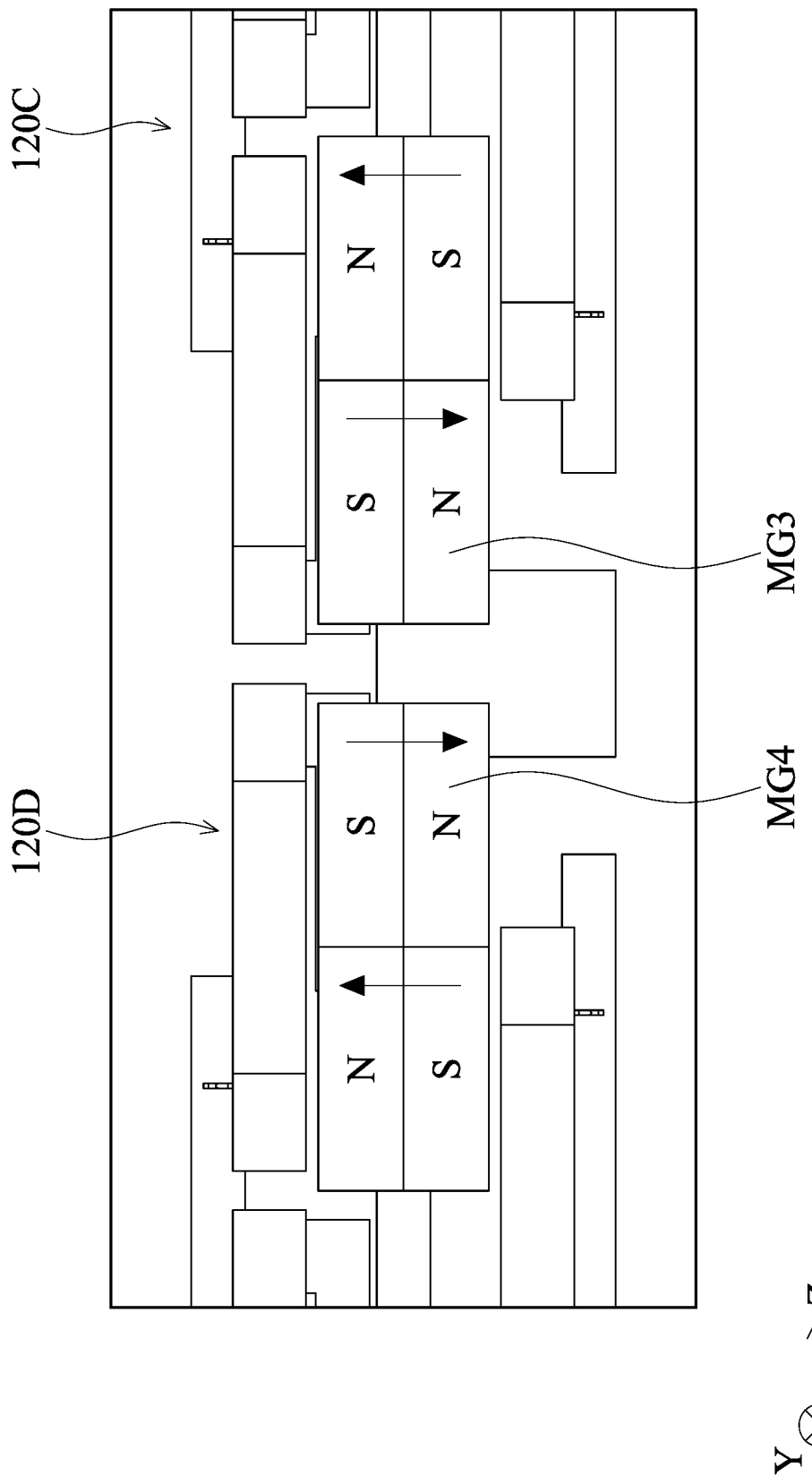
FIG. 12 is an enlarged schematic diagram of FIG. 11 according to the embodiment of the present disclosure.

Please refer to FIG. 11 and FIG. 12. FIG. 12 is an enlarged schematic diagram of FIG. 11 according to the embodiment of the present disclosure. In this embodiment, the magnetic pole directions of the magnetic element 6-MG3 of the driving assembly 6-120C and the magnetic element 6-MG4 of the driving assembly 6-120D are parallel to each other, and the magnetic element 6-MG3 and the magnetic element 6-MG4 can move in the opposite directions. For example, the magnetic element 6-MG3 moves in the +Z-axis, and the magnetic element 6-MG4 moves in the −Z-axis.

In addition, in this embodiment, the circuit assembly 6-130C and the circuit assembly 6-130D share the same ground terminal, but in other embodiments, they can be connected to different ground terminals respectively.

The present disclosure provides an optical element driving mechanism configured to drive the movable assembly 6-108 (for example, a camera lens) for performing the auto-focus function. In an embodiment of the present disclosure, the optical element driving mechanism 6-100 may include a first coil group 6-121, a second coil group 6-122, and a magnetic module 6-123. When the first coil group 6-121 and the second coil group 6-122 are provided with electricity, they can act with the magnetic module 6-123 to generate the electromagnetic driving force to move the magnetic module 6-123 in the first direction. Because the coils in the first coil group 6-121 and the second coil group 6-122 are turned on in sequence, it can ensure that the magnetic module 6-123 moves smoothly in the first direction, and the range of motion of the movable assembly 6-108 can be increased.

Based on the design of the optical element driving mechanism in this disclosure, a greater driving force can be achieved to drive the aforementioned camera lens, and the purpose of miniaturization can also be achieved at the same time.

Although the embodiments and their advantages have been described in detail, it should be understood that various changes, substitutions, and alterations can be made herein without departing from the spirit and scope of the embodiments as defined by the appended claims. Moreover, the scope of the present application is not intended to be limited to the particular embodiments of the process, machine, manufacture, composition of matter, means, methods, and steps described in the specification. As one of ordinary skill in the art will readily appreciate from the disclosure, processes, machines, manufacture, compositions of matter, means, methods, or steps, presently existing or later to be developed, that perform substantially the same function or achieve substantially the same result as the corresponding embodiments described herein can be utilized according to the disclosure. Accordingly, the appended claims are intended to include within their scope such processes, machines, manufacture, compositions of matter, means, methods, or steps. In addition, each claim constitutes a separate embodiment, and the combination of various claims and embodiments are within the scope of the disclosure.

What is claimed is:

1. An optical element driving mechanism, comprising:
a fixed assembly;
a movable assembly, movable relative to the fixed assembly;
a driving assembly, configured to drive the movable assembly to move relative to the fixed assembly, the driving assembly comprising:
a first coil group, having a plurality of first coils, wherein each of the first coils includes a first electrical connection portion and a second electrical connection portion; and a magnetic module, having a magnetic element and a first conductive element; and a circuit assembly, comprising:
a first circuit member, electrically connected to the first conductive element; and
a second circuit member, electrically connected to the first electrical connection portions;
wherein when the magnetic module is located in different positions relative to the first coil group, the first conductive element is electrically connected to the second electrical connection portion of different first coils in sequence, so that the first coils which are electrically connected to the first conductive element are electrically connected to the first circuit member and the second circuit member, and the second electrical connection portions of the first coils which are not electrically connected to the first conductive element remain open.

2. The optical element driving mechanism as claimed in claim 1, wherein the magnetic module further includes a second conductive element, the first conductive element is electrically connected to the first circuit member through the second conductive element, and the second conductive element is movable relative to the first conductive element or the first circuit member.

3. The optical element driving mechanism as claimed in claim 2, wherein the second conductive element is movable relative to the first conductive element and the first circuit member.

4. The optical element driving mechanism as claimed in claim 1, wherein intervals between the second electrical connection portions are substantially the same.

5. The optical element driving mechanism as claimed in claim 1, wherein the magnetic module further includes an insulating element disposed between the magnetic element and the first conductive element.

6. The optical element driving mechanism as claimed in claim 1, wherein the driving assembly further includes a second coil group which has a plurality of second coils, and the first coil group and the second coil group are disposed on different planes.

7. The optical element driving mechanism as claimed in claim 6, wherein each of the second coils includes:
a third electrical connection portion, electrically connected to the second circuit member; and
a fourth electrical connection portion;
wherein when the magnetic module is located in different positions relative to the second coil group, the first conductive element is electrically connected to the fourth electrical connections of different second coils in sequence, so that the second coils which are electrically connected to the first conductive element are electrically connected to the first circuit member and the second circuit member, and the fourth electrical connections of the second coils which are not electrically connected to the first conductive element remain open.

8. The optical element driving mechanism as claimed in claim 6, wherein when viewed in a direction of a winding axis of the first coil, the first coil partially overlaps at least two second coils.

9. The optical element driving mechanism as claimed in claim 6, wherein the magnetic module is disposed between the first coil group and the second coil group.

10. The optical element driving mechanism as claimed in claim 9, wherein the second electrical connection portions and the fourth electrical connection portions are disposed on the same plane.

11. The optical element driving mechanism as claimed in claim 6, wherein the first coil group is disposed between the magnetic module and the second coil group.

12. The optical element driving mechanism as claimed in claim 11, wherein the optical element driving mechanism further includes a plurality of first conductive plates and a plurality of second conductive plates, the first coil is electrically connected to the corresponding first conductive plate, the second coil is electrically connected to the corresponding second conductive plate, and the first conductive plate and at least one portion of the second conductive plate are disposed on different planes.

13. The optical element driving mechanism as claimed in claim 1, wherein the optical element driving mechanism further includes a pressing assembly configured to drive the magnetic element to contact the first circuit member.

14. The optical element driving mechanism as claimed in claim 13, wherein the pressing assembly includes a magnetically conductive element corresponding to the magnetic element.

15. The optical element driving mechanism as claimed in claim 1, wherein the first coils are arranged in a first direction, and the driving assembly is configured to drive the movable assembly to move in the first direction relative to the fixed assembly.

16. The optical element driving mechanism as claimed in claim 15, wherein a magnetic pole direction of the magnetic element is parallel to the first direction.

17. The optical element driving mechanism as claimed in claim 15, wherein the magnetic element has a plurality of magnetic pole units, and magnetic pole directions of the magnetic pole units are different from the first direction.

18. The optical element driving mechanism as claimed in claim 15, wherein the optical element driving mechanism includes a plurality of movable assemblies and a plurality of driving assemblies, and these movable assemblies are arranged in the first direction.

19. The optical element driving mechanism as claimed in claim 18, wherein each of the driving assemblies includes a magnetic element, and magnetic pole directions of the magnetic elements are parallel to each other.

20. The optical element driving mechanism as claimed in claim 18, wherein each of the driving assemblies includes a magnetic element, and magnetic pole directions of the magnetic elements are different.

* * * * *